United States Patent [19]
Ross

[11] Patent Number: 5,440,355
[45] Date of Patent: Aug. 8, 1995

[54] COMFORTABLE EYEGLASS COVER

[76] Inventor: Kelly G. Ross, 106 Shadow Ridge Dr., Pittsburgh, Pa. 15238

[21] Appl. No.: 198,370

[22] Filed: Feb. 18, 1994

[51] Int. Cl.⁶ ............................................... G02C 5/14
[52] U.S. Cl. ................................................... 351/122
[58] Field of Search .................. 351/111, 122, 51, 123, 351/246; 2/442, 423

[56] References Cited

U.S. PATENT DOCUMENTS 3,993,403  11/1976  Brown ................................. 351/122
4,786,158  11/1988  Barfus-Shanks et al. ............ 351/122

FOREIGN PATENT DOCUMENTS 0042712  12/1981  European Pat. Off. ............ 351/111
3902126   8/1990  Germany ............................. 351/122

Primary Examiner—William L. Sikes
Assistant Examiner—Huy Mai
Attorney, Agent, or Firm—Webb Ziesenheim; Bruening Logsdon; Orkin & Hanson

[57] ABSTRACT

A comfortable, protective eyeglass cover for the temples and earpieces of a pair of eyeglasses is disclosed. The protective cover includes a pair of sleeve members with each of the sleeve members having a hollow interior and an opening at a first end extending into the hollow interior. Each of the sleeve members is configured to receive one of the temple and earpieces of the eyeglasses within the hollow interior through the opening. The protective cover increases the comfort to the user as well as tightening the grip of the eyeglasses.

12 Claims, 1 Drawing Sheet

COMFORTABLE EYEGLASS COVER

BACKGROUND OF THE INVENTION

1. Field of the Invention

The present invention relates to eyeglasses, more particularly to a protective, comfortable eyeglass cover for the temples and earpieces of a pair of eyeglasses.

2. Prior Art

Conventional eyeglasses include a frame member for supporting a pair of lenses, with a pair of temples hinged to opposed sides of the frame member. An earpiece, or bow, is attached to one end of each temple opposite the frame member and curves over the user's ears and presses against the side of the user's head. The pressing of the earpieces against the side of the head often results in discomfort to the user and chafing of the skin. Eyeglass earpieces have been coated with a plastic or similar material to prevent the eyeglass frame from resting against the head, but the pressure of the earpieces can still be excessive and uncomfortable. For the foregoing reasons, there is a need for minimizing the pressure of the earpieces against the user's head to alleviate the associated discomfort.

It is an object of the present invention to overcome the aforementioned drawbacks of conventional eyeglasses. It is another object of the present invention to provide a simple, easily assembled device for alleviating the discomfort of eyeglass wearers. It is a further object of the present invention to provide a device which is unobtrusive, decorative and easily replaceable.

SUMMARY OF THE INVENTION

The present invention provides a protective, comfortable eyeglass cover for the temples and earpieces of a pair of eyeglasses. The protective cover includes a pair of sleeve members with each sleeve member having a hollow interior and an opening at a first end extending into the hollow interior. Each sleeve member is configured to receive one of the temples and earpieces of the eyeglasses within the hollow interior through the opening.

The sleeve members of the present invention preferably include a first substantially straight portion adjacent the first end of the sleeve member and a curved portion adjacent the straight portion. The curved portion of each sleeve member has a shape which corresponds to the shape of the earpiece. In one embodiment of the present invention, the sleeve members are formed of two side sleeve members attached at portions of their peripheral edges. The side sleeve members may be formed of a felt material which is sewn at the peripheral edges. The side sleeve members may be attached all along their periphery except at the opening end, thereby forming a closed end of the sleeve member opposite the open end.

DESCRIPTION OF THE PREFERRED EMBODIMENTS

Figure 1:
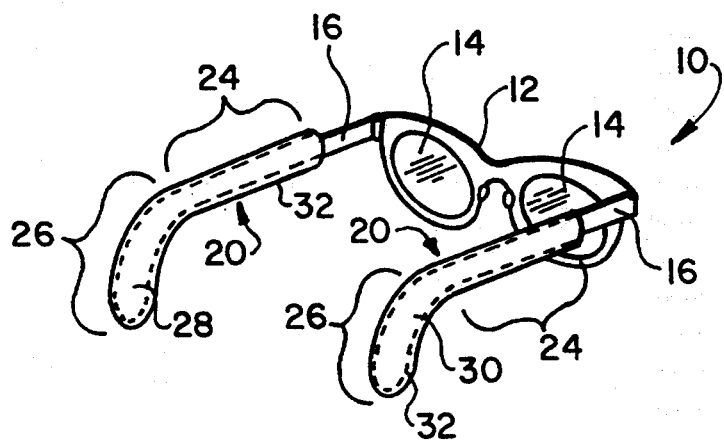
FIG. 1 is a perspective view of a comfortable eyeglass cover positioned on a pair of eyeglasses according to the present invention.
Figure 2:
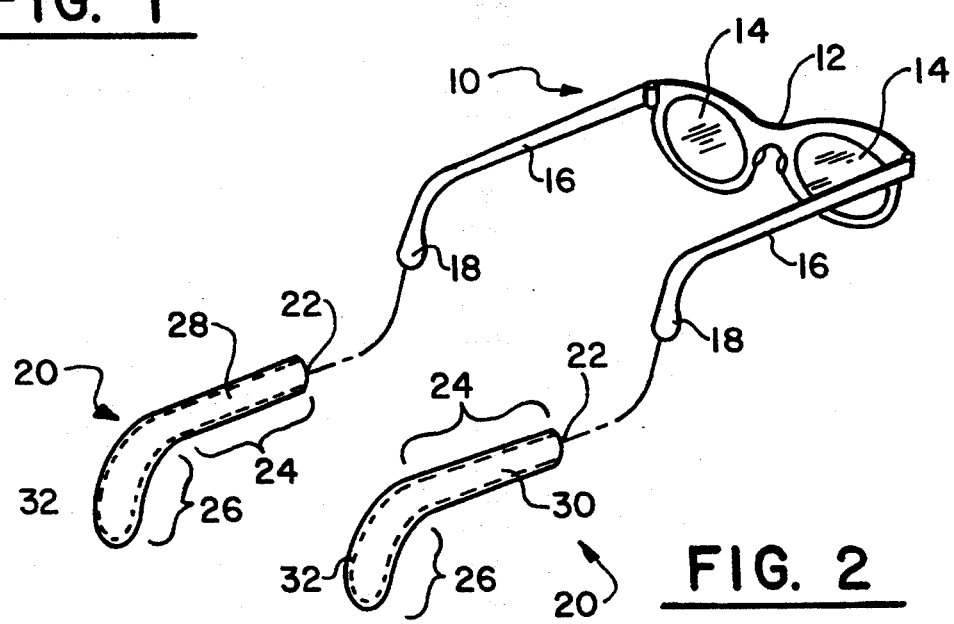
FIG. 2 is an exploded view of the comfortable eyeglass cover and eyeglasses illustrated in FIG. 1.

The comfortable eyeglass cover of the present invention is illustrated in FIGS. 1 and 2 and is configured for use with a pair of eyeglasses 10. The pair of eyeglasses 10 includes a frame member 12 supporting a pair of lenses 14. A pair of temples 16 are hinged to opposite sides of the frame member 12 with earpieces 18, or bows, attached to the temples 16 at an end thereof opposite of the frame member 12.

The comfortable eyeglass cover includes a pair of sleeve members 20 with each of the sleeve members 20 having a hollow interior and an opening 22 at a first end extending into the hollow interior. The opening 22 is most clearly shown in FIG. 4. Returning to FIGS. 1 and 2, each sleeve member 20 is configured to receive one temple 16 and earpiece 18 within the hollow interior through the opening 22.

Each sleeve member 20 includes a substantially straight portion 24 which is adjacent the first end and the opening 22 and a curved portion 26 adjacent the straight portion 24. The curved portion 26 is shaped to correspond to the shape of the earpiece 18 while the shape of the straight portion 24 corresponds to the shape of the temples 16.

Each sleeve member 20 may be formed of a pair of side sleeve members 28 and 30, respectively, which are attached together at portions of their peripheral edges. The side sleeve members 28 and 30 may be formed of fabric material such as, for example, felt which is fastened together by stitching 32 along the peripheral edges of the side sleeve members 28 and 30. The stitching 32 would not extend along opening 22.

The inside surfaces of the side sleeve members 28 and 30, which form the hollow interior of the sleeve members 20, should be formed of a high frictional surface to maintain the comfortable eyeglass covers in position on the temples 16 and earpieces 18 of the eyeglasses 10. This may be achieved by lining the inside surface of the side sleeve members 28 and 30 with an appropriate high frictional material. The exterior surface of the side sleeve members 28 and 30 is preferably formed of a soft material to maximize the comfort of the user.

Figure 3:
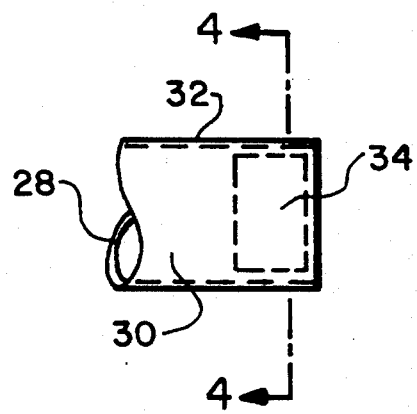
FIG. 3 is an enlarged side view of a modified sleeve member of the comfortable eyeglass covers illustrated in FIGS. 1 and 2.
Figure 4:
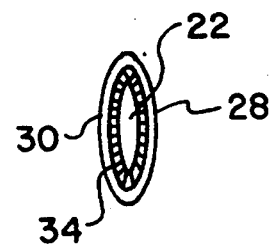
FIG. 4 is a cross-sectional view of the sleeve member illustrated in FIG. 3.

The comfortable eyeglass cover of the present invention may include a gripping elastic band 34, shown in FIGS. 3 and 4, which can be attached to the inside surface of the side sleeve members 28 and 30 adjacent the opening 22 at the first end to grip the temples 16 and better retain the sleeve members 20 in position.

In operation, the sleeve members 20 are slid over the earpieces 18 and temples 16 of the eyeglasses 10 to reduce the pressure of the eyeglass earpiece 18 on the head of the wearer. It is anticipated that the straight portion 24 may be trimmed appropriately to fit the temples 16 in the desired manner. Therefore, the sleeve members may be manufactured in lengths exceeding those of conventional earpieces and temples without inconvenience. The exterior surface of the side sleeve member 30 may be decorated with appropriate ornamentation, as desired, to increase the aesthetic appearance of both the eyeglasses and the comfortable eyeglass covers.

Although the present invention has been described in detail in connection to the discussed embodiments, various modifications may be made by one of ordinary skill in the art without departing from the spirit and scope of the present invention. Therefore, the scope of the present invention should be determined by the attached claims.

I claim:

1. A protective cover for the temples and earpieces of a pair of eyeglasses, said protective cover comprising a pair of sleeve members, with each said sleeve member having a hollow interior and an opening at a first end extending into said hollow interior and two side sleeve members formed of fabric material sewn together at the peripheral edges of said side sleeve members which are not adjacent said opening, and further including a temple gripping means within said hollow interior adjacent said first end for gripping said temples of said pair of eyeglasses, wherein said gripping means includes an elastic band attached to said side sleeve members in said hollow interior adjacent said opening at said first end, whereby each said sleeve member is configured to receive one said temple and said earpiece of said pair of eyeglasses within said hollow interior through said opening.

2. The protective cover of claim 1 wherein each said sleeve member comprises a substantially straight portion adjacent said first end and a curved portion adjacent said substantially straight portion.

3. The protective cover of claim 2 wherein said curved portion conforms to the shape of said earpieces of said pair of eyeglasses.

4. The protective cover of claim 3 wherein said hollow interior has an inner surface covered with frictional material.

5. The protective cover as set forth in claim 1 wherein said side sleeve members of each said sleeve member are formed of felt material.

6. A pair of eyeglasses comprising:
a frame member;
lens means supported by said frame member;
a pair of temples connected to opposite sides of said frame member;
a pair of earpieces, with each one of said pair of temples coupled to one of said pair of earpieces; and
a pair of sleeve members, with each said sleeve member having a hollow interior and an opening at a first end extending into said hollow interior and two side sleeve members formed of fabric material sewn together at the peripheral edges of said side sleeve members which are not adjacent said opening, and further including a temple gripping means positioned within said hollow interior and attached to each said side sleeve member adjacent said first end and adjacent said temples for gripping said temples of said pair of eyeglasses, wherein said gripping means includes an elastic band attached to said side sleeve members positioned in said hollow interior adjacent said opening and said first ends, whereby each said sleeve member is configured to receive one said temple and one said earpiece within said hollow interior through said opening.

7. The eyeglasses of claim 6 wherein each said sleeve member comprises a substantially straight portion adjacent said first end and a curved portion adjacent said substantially straight portion.

8. The eyeglasses of claim 7 wherein the shape of each said curved portion corresponds to the shape of each said earpiece.

9. The eyeglasses as set forth in claim 8 wherein a second end of each said pair of sleeve members which is opposed from said first end is closed.

10. The eyeglasses as set forth in claim 6 wherein said side sleeve members of each said sleeve member are formed of felt material.

11. A method of adapting eyeglasses for wearing by a wearer, wherein said eyeglasses have earpieces, said method comprising the steps of:
a) providing a protective cover for the earpieces, said protective cover comprising a pair of sleeve members, with each said sleeve member having a hollow interior and an opening at a first end extending into said hollow interior and two side sleeve members formed of a fabric material sewn together at the peripheral edges of said side sleeve members which are not adjacent said opening, and further including earpiece gripping means with said hollow interior and attached to each said sleeve member adjacent said first end for gripping said earpieces of said pair of eyeglasses, wherein said gripping means includes an elastic band attached to each said side member and positioned in said hollow interior adjacent said opening and said first end of said sleeve member, whereby each said sleeve member is configured to receive one earpiece of the eyeglasses within said hollow interior through said opening;
b) inserting each of the earpieces into said opening in one of said protective covers, whereby said gripping means can grip said earpiece; and
c) wearing the eyeglasses so that said protective covers fit over the wearer's ears.

12. A method of decorating eyeglasses, wherein said eyeglasses have earpieces, said method comprising the steps of:
a) providing a protective cover, said protective cover comprising a pair of sleeve members, one for each of the earpieces, with each said sleeve member having an exterior surface, a hollow interior and an opening at a first end extending into said hollow interior and a pair of side sleeve members formed of a fabric material which are sewn together at the peripheral edges of said side sleeve members which are not adjacent said opening, and further including earpiece gripping means positioned within said hollow interior and attached to each said sleeve member adjacent said first end for gripping said earpieces of said pair of eyeglasses, wherein said gripping means includes an elastic band positioned in said hollow interior adjacent said opening and said first end and attached to each said sleeve member, each said sleeve member configured to receive one earpiece of the eyeglasses within said hollow interior through said opening, wherein said exterior surface bears decoration; and
b) inserting each of the earpieces into said opening in one of said protective covers to produce decorated eyeglasses.

* * * * *

UNITED STATES PATENT AND TRADEMARK OFFICE
CERTIFICATE OF CORRECTION

PATENT NO. : 5,440,355
DATED : August 8, 1995
INVENTOR(S) : Kelly G. Ross

It is certified that error appears in the above-indentified patent and that said Letters Patent is hereby corrected as shown below:

Claim 6 Line 56 Column 3 "ends," should read --end,--.

Signed and Sealed this

Twenty-fourth Day of October, 1995

Attest:

BRUCE LEHMAN

Attesting Officer  Commissioner of Patents and Trademarks